Aug. 3, 1937.   W. H. FREYGANG   2,088,850
FLOTATION SYSTEM FOR AIRCRAFT
Original Filed July 14, 1934   2 Sheets-Sheet 2

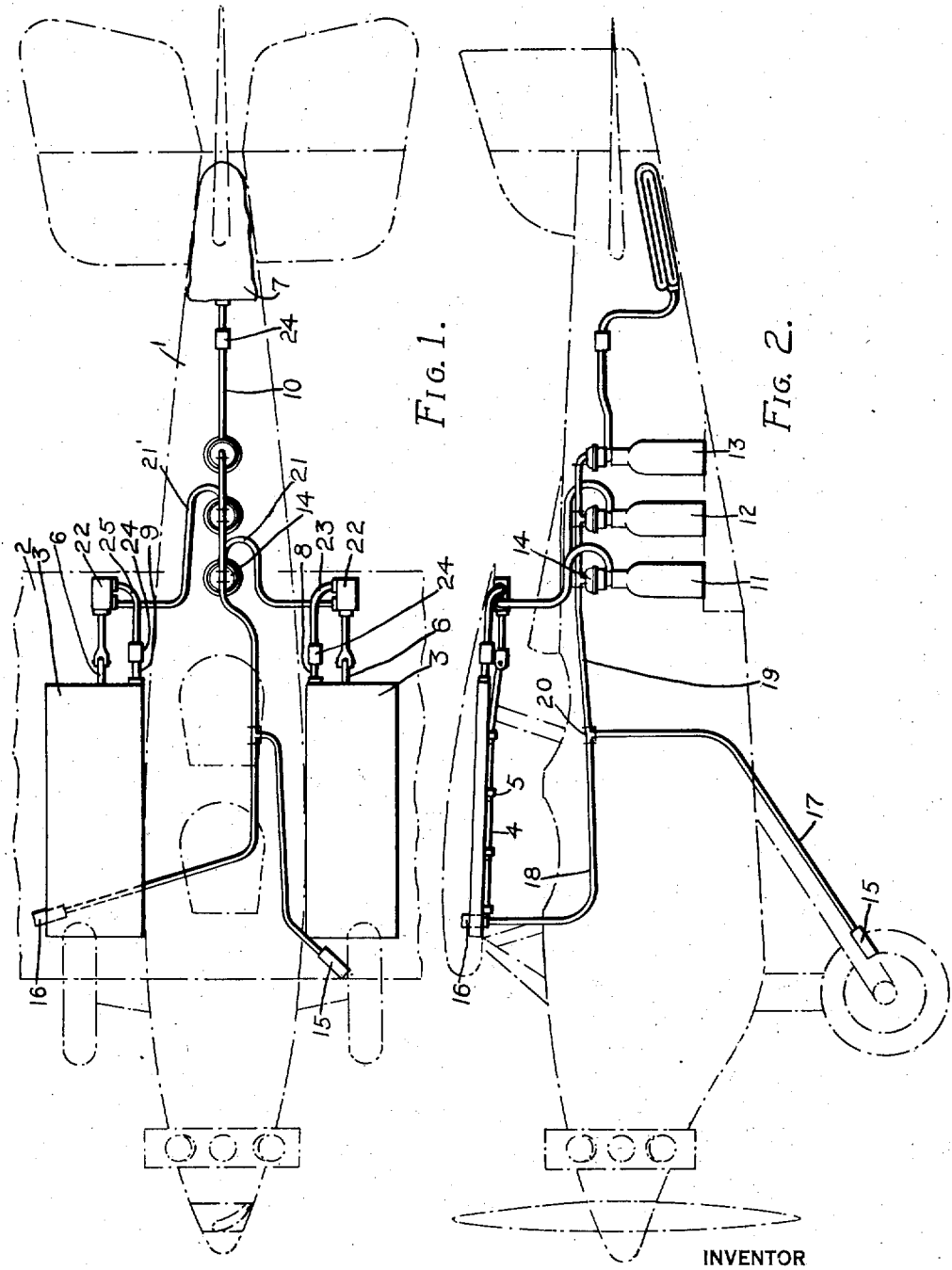

INVENTOR
WALTER H. FREYGANG
BY
J. William Carson
ATTORNEY

Patented Aug. 3, 1937

2,088,850

UNITED STATES PATENT OFFICE 2,088,850

FLOTATION SYSTEM FOR AIRCRAFT

Walter H. Freygang, Essex Falls, N. J., assignor to Walter Kidde & Company, Inc., Bloomfield, N. J., a corporation of New York Application July 14, 1934, Serial No. 735,150
Renewed December 10, 1936

7 Claims. (Cl. 9—19)

The present invention relates to a flotation system for aircraft of the type comprising an arrangement wherein inflatable bags are provided on the aircraft and are adapted to be inflated with a buoyant fluid when the aircraft descends upon a body of water. When inflated, the bags form buoyant floats for supporting the aircraft and prevent it from sinking.

In aircraft flotation systems of this type, it is highly important that the fluid should not be released prior to the alighting of the aircraft upon the water, since the great resistance offered by the inflated devices to the travel of the aircraft through the air would be extremely hazardous to the continued flight of the aircraft.

In order to eliminate, as far as possible, the personal element as a factor in the operation of systems of this character, the present invention has been developed and provides an apparatus wherein the supply of buoyant fluid is automatically released to inflate the inflatable bags upon contact of the aircraft with any body of water upon which it should alight.

In systems of this type for use on aircraft it is desirable that the weight of the equipment be as light as possible, and that the means for effecting the operation of the apparatus be simple and especially reliable under the emergency conditions for which the system is required.

It is accordingly an object of the present invention to provide an aircraft flotation system which is both light and compact, and in which the requisite operating force is obtained from means simple in construction and reliable in operation.

Another object of the invention is to provide an aircraft flotation system wherein the supply of buoyant fluid is automatically released from a plurality of containers thereof to inflate the inflatable bags upon contact of the aircraft with any body of water upon which it should alight.

A further object of the invention is to provide a system of the above character which functions automatically upon contact of the aircraft with water regardless of whether the aircraft alights upon the water in an upright or in an inverted position.

A further object of the invention is to provide a mechanism which effectively prevents accidental inflation of the flotation bags upon accidental discharge of the buoyant fluid due to dangerous increases in temperature and pressure of the inflating medium stored in the containers.

A further object of the invention is to provide a system for releasing pressure fluid in a plurality of containers in which the accidental discharge of fluid from one or more containers due to dangerous increases in temperature and pressure of the contained fluid will not cause operation of the remaining containers with attendant loss of the fluid supply.

In the preferred embodiment of the invention the buoyant fluid is contained in a pressure container sealed by a frangible disc adapted to be pierced by a puncturing member normally maintained out of contact with the frangible disc, but operable to pierce the disc by pressure developed upon immersion in water of an actuator containing a substance which generates large volumes of gas or vapor upon reaction of the substance with water.

In another type of actuator for use with the present invention, the actuating pressure is developed from a substance which generates heat upon reaction of the substance with water, the developed heat being utilized to develop the desired operating pressure in a normally confined body of air or other fluid.

Further objects and features of the invention, not specifically enumerated above, will be apparent as the invention is described in greater detail in connection with the accompanying drawings, wherein:

Figure 1 is a plan view showing flotation equipment constructed in accordance with the present invention and applied to an aeroplane which is indicated in dot and dash lines.

Figure 2 is a view in side elevation showing the equipment of Figure 1 and likewise the aeroplane upon which it is installed, the aeroplane being shown in dot and dash lines.

Figure 3:
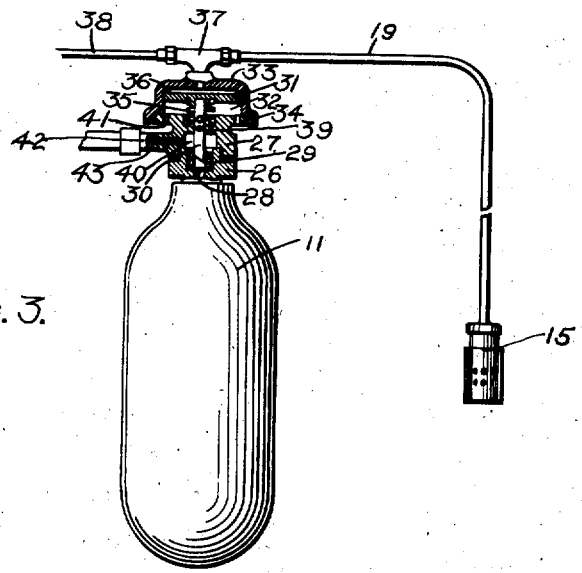
Figure 3 is a view, partly in transverse section, showing a container, its releasing mechanism, and an actuator, all in accordance with the present invention.

Referring to Figures 1 and 2 of the above drawings, an aeroplane fuselage is indicated at 1, and the wing of the aeroplane at 2. On the underneath side of the wing and within the stream line of the wing are set flotation bag containers 3, each containing a normally deflated flotation bag retained within the container by means of wires 4 which pass through ringlets 5 to maintain the cover of each container closed. In order that the flotation bags may be secured effectively to the plane rope loops are secured to the bags and in turn to the structure of the wing of the plane. A cable or rod 6 operates all of the wires 4 to disengage the ringlets 5, thus enabling a container 3 to be opened. When, therefore, a flotation bag is inflated by a compressed fluid, such as air or carbon dioxide, the bag expands and frees itself from the container, the cover being so constructed as to permit the bag to assume its inflated position. Another flotation bag 7, normally deflated, is provided within the aft compartment of the fuselage, but this bag need not be stored in a container, as it is in an out-of-the-way location and as it is already within the stream lines of the plane. For the purpose of expanding the flotation bags, conduits 8, 9 and 10 are connected to the respective bags, the conduits being respectively connected to the pressure medium containers 11, 12 and 13.

Each of the pressure medium containers 11, 12 and 13 is provided with a releasing mechanism 14, described in detail hereinafter, the releasing mechanisms of the several containers being actuated by pressure developed upon immersion in water of one of the actuator members 15 or 16, the operating pressure being transmitted to the releasing mechanisms of the containers through either the tube 17 or the tube 18, both of which are connected to the pressure inlet connection 19 through a special fitting 20, forming no part of the present invention, which fitting prevents pressure developed by the actuator 15 from escaping through the actuator 16, at the same time preventing pressure developed by the actuator 16 from escaping through the actuator 15.

Upon release of the medium within the pressure medium container 11, it passes through a discharge line 21 into one end of a piston bag release 22, driving the piston toward the right, as viewed in Figures 1 and 2, and disengaging the wires 4 from the ringlets 5. When the piston in the piston bag release 22 reaches the end of its stroke, the medium escapes through a conduit 23, a check valve 24 and the conduit 8 into the flotation bag, thus causing it to expand in accordance with the pressure of the medium. During the inflation of the bag the cover of the container 3, containing such bag, lifts so as to permit the free inflation of the bag. By providing a check valve as indicated at 24 the medium which has expanded into the flotation bag is prevented from escaping therefrom, continued passage of the medium into the bag being freely permitted. The flotation bag contained in the other container 3 is similarly inflated from the pressure medium container 12, the pressure medium being discharged into the flotation bag through the discharge line 21', another piston bag release 22, the conduit 25, another check valve 24, and the conduit 9. The flotation bag 7 is inflated directly through the conduit 10, no piston bag release being necessary, but only a check valve 24.

Referring now to Figure 3 of the drawings, a container 11 is provided, within which a supply of a medium under pressure is maintained by means of a closure body 26 and a bonnet 27. The closure body 26 is threaded into the top of the container 11 and is provided with a frangible disc 28 secured in position by a nut 29. The cutter 30 is movable within the nut 29, the cutter being secured by a piston 31 engaging with a close-working fit the side wall of a chamber 32 formed in a head 33, which latter is secured to the bonnet 27 by means of screw threads 34. A coiled spring 35 serves to yieldingly maintain the piston 31 in its uppermost position in contact with a shoulder 36 on the head 33, thus normally maintaining the cutter 30 out of contact with the frangible disc 28.

The space above the piston communicates with one of the actuators 15 or 16 through the pressure inlet connection 19, and a T fitting 37, the tubing 38 connecting with the space above the piston of the releasing mechanism of another pressure medium container.

In order to prevent the discharge of the pressure medium from the container into the flotation bags in the event of rupturing of the frangible disc 28 due to the development of an excessive temperature and pressure in the container, at the same time permitting the pressure fluid to be discharged into the flotation bags when the flotation system is operated in the desired manner, a special construction is employed. This construction comprises the employment of one or more perforations 39 in the walling of the hollow tubular cutter 30, these perforations being normally in communication with the chamber 32 of the head 33 when the piston 31 is in its uppermost position; the perforations entering into communication with the chamber 40, which is formed between the closure body 26 and the bonnet 27, when the cutter 30 is advanced to pierce the frangible disc. The bonnet 27 is provided with one or more openings 41 establishing communication between the chamber 32 and the outer atmosphere, so that, if the pressure fluid is released from the container 11 by rupturing of the frangible disc 28 due to the development of an excessive pressure within the container, the pressure fluid will be discharged through the hollow tubular cutter 30, the perforations 39, the chamber 32 and the openings 41 to the outer atmosphere, thus relieving the pressure within the container, but preventing undesirable and hazardous inflation of the flotation bags during the flight of the aircraft. For the discharge of the pressure medium into the flotation bags, the bonnet 27 is provided with an outlet 42 having a passage 43 communicating with the chamber 40. When, therefore, the cutter 30 is caused to pierce the frangible disc 28 by advancing the cutter through the frangible disc, the pressure medium flows from the container, through the hollow tubular cutter 30, through the perforations 39, into the chamber 40, and out through the passage 43 in the outlet connection 42. The outlet connection 42, of course, may be connected to a conduit 21 as shown in Figure 1 of the drawings.

The construction of the actuators 15 and 16 will now be described in detail in connection with Figures 4 and 5.

Figure 4:
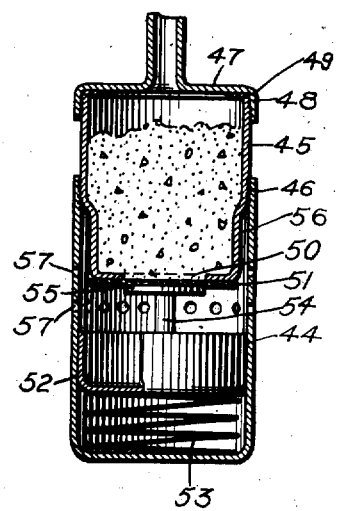
Figure 4 is an enlarged view, in cross-section, of a pressure actuator in accordance with the invention.

Referring first of all to Figure 4, an actuator is provided comprising a lower casing 44, an upper casing 45 secured to the lower casing by means of screw threads 46, and a cover member 47 adapted for connection to pressure transmitting tubing, such as the tube 17 or 18 shown in Figure 1. The cover member 47 is secured to the upper casing 45 by means of screw threads 48, a sealing gasket 49 being employed to effect a tight seal between the cover member and the upper casing. In the lower wall of the upper casing 45 is provided an opening 50, which is closed by means of a thin disc 51 of a material which either dissolves or weakens under the influence of water. Within the lower casing 44 is provided a cup shaped piston 52, which is normally urged upwardly by means of a coiled spring 53, but which is maintained in spaced relationship with the upper casing 45 by means of a pin 54, secured at one end to the piston 52 and at the other end to a disc 55, which latter bears against the thin disc 51 and is of somewhat smaller diameter than the opening 50. The lower portion of the upper casing 45 is reduced in diameter so as to form an annular space 56 of sufficient width and length to receive the upturned edge of the cup shaped piston 52. Disposed around the circumference of the lower casing 44 and above the level of the upturned edge of the cup shaped piston 52 are a number of openings 57. The actuator assembly is completed by placing within the upper casing 45 some substance which will generate a large volume of gas or vapor when brought into contact with water. For instance, calcium carbide might very well serve the purpose of this invention.

The manner of operation of the above described actuator is extremely simple. Thus, upon immersion of the actuator in water, the water flows through the openings 57, filling the space between the piston 52 and the upper casing 45. The thin disc 51 then dissolves or softens under the influence of the water, thus removing its restraining effect on the piston, and the piston then moves upwardly under the influence of the spring 53, forcing the water carried within the cup portion of the piston up into the upper casing 45, where the water reacts with the gas forming material in the upper casing, developing a pressure which is transmitted through the pressure transmitting tubing to the releasing mechanisms of the several pressure medium containers. Of course, the disc 55 is forced within the upper casing, and the upturned edge of the piston enters the annular space 56. When the piston 52 reaches the upper limit of its motion, water flows through the lower openings 57 into the space beneath the piston forming an incompressible body which will prevent the return movement of the piston under the influence of the pressure developed in the upper casing 45. At the same time the circumferential portion of the piston will cover the openings 57, and thus prevent escape of the pressure medium through these openings.

Figure 5:
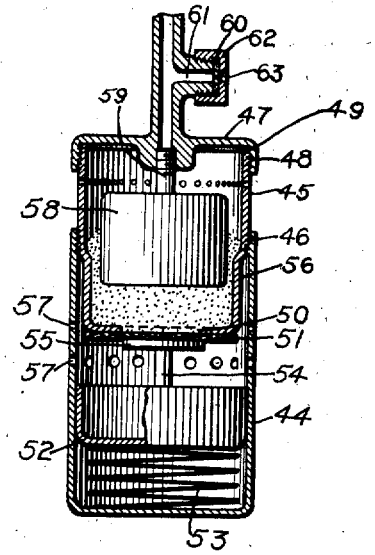
Figure 5 is an enlarged view, in cross-section, of another type of pressure actuator in accordance with the invention.

The type of actuator shown in Figure 5 is generally similar to that shown in Figure 4 and will not be described again in detail. It should be noted, however, that those elements corresponding exactly to the same elements in Figure 4 have been indicated by the same reference characters. The actuator in Figure 5 differs from the actuator in Figure 4 in the provision of a closed receptacle 58, preferably of a relatively thin and relatively good heat conducting material, communicating with the pressure transmitting tubing through a connecting tube 59, and in the provision of a substance developing a considerable amount of heat upon coming in contact with water. Such a substance might be, by way of example, metallic sodium.

Within the receptacle 58 and the pressure transmitting tubing connected to the various releasing mechanisms may be placed a readily volatile or rapidly expanding fluid medium.

When, therefore, the actuator of Figure 5 is immersed in water, the heat developed within the upper casing 45 is transmitted to the fluid within the receptacle 58, the volatilization or expansion of which builds up sufficient pressure to operate the releasing mechanisms of the several pressure medium containers.

In order to prevent the operation of the releasing mechanisms due to a gradual but continued rise in the temperature of the fluid medium within the receptacle 58, a venting element 60 is arranged to close a passage 61 communicating with the pressure transmitting tubing, said venting element being secured in position by a nut 62 having an opening 63. The venting element 60 is of such a construction as to relieve any pressure gradually developing within the pressure transmitting tubing, but is such that it cannot relieve the pressure which develops suddenly upon the immersion of the actuator in water.

Of course, the releasing mechanism 14 may be of such a construction as to operate upon the development of a relatively small pressure, and in this case the fluid medium within the pressure transmitting tubing may be atmospheric air, the venting element 60 serving to maintain atmospheric pressure in the pressure transmitting tubing.

Where, however, highly volatile or rapidly expanding fluid is employed in the pressure transmitting tubing, means must be provided to constantly replenish any of the fluid which escapes through the venting element 60. Such a replenishing device may be of any suitable design, such as is employed in connection with other fluid filled piping systems, and will not be described herein.

It should be understood that the disc 51 is not necessarily composed of a substance which goes into solution in water, but may be of a material which softens or weakens or the like; and the term dissoluble where used in the claims is intended to refer to a wide range of substances which dissolve, disintegrate, decompose, soften, weaken, and the like, upon immersion in water.

From the foregoing description it will be seen that I have provided a simple, effective and reliable flotation system for aircraft; one which, by reason of the fewness of parts and the details of construction, is of a desired lightness in weight and compactness.

What I claim as my invention and desire to secure by Letters Patent is:

1. In a releasing device for releasing a medium from a container in which the medium is stored under pressure, the combination of a body member to be secured to the container, a frangible disc carried by the body member and confining the medium within the container, disc rupturing means for rupturing the frangible disc to release the medium, means operable by developed fluid pressure to operate the disc rupturing means, a chambered member containing a substance which develops heat upon contact of the substance with water, a second chambered member located within the first named chambered member and closed off therefrom and containing a fluid expansible to develop an operating pressure upon heating of said fluid, means to effect access of water to said substance upon immersion of the first named chambered member in water, and means defining a pressure transmitting path between said second named chambered member and said means operable by developed fluid pressure.

2. An actuator for developing a fluid operating force upon immersion of the actuator in water comprising a chambered member containing a substance capable of reacting with water to give off energy, an opening in the wall of said chamber to admit water to said chamber upon immersion of said chambered member in water, means dissoluble in water normally closing off said opening from outer media to admit water to said chamber upon immersion and dissolution thereof in water, a second chambered member secured to said first named chambered member and encompassing said opening, a piston-like member in said second chambered member, means normally urging said piston-like member toward said opening, means normally spacing said piston-like member from said opening comprising means bearing on said means normally closing off said opening, at least one opening in the wall of said second chambered member between said first named opening and said piston-like member, said piston-like member being adapted to move past said second named opening to admit water beneath the piston and to isolate said substance from the exterior body of water after the water has had access to said substance, and means to utilize said energy to give the desired operating force.

3. An actuator for developing a fluid operating force upon immersion of the actuator in water comprising a chambered member containing a substance capable of reacting with water to give off energy, an opening in the wall of said chamber to admit water to said chamber upon immersion of said chambered member in water, means dissolvable in water normally closing off said opening from outer media to admit water to said chamber upon immersion and dissolution thereof in water, a second chambered member secured to said first named chambered member and encompassing said opening, a piston-like member in said second chambered member having a rim turned toward said opening and thereby forming a cup, means normally urging said piston-like member toward said opening, means normally spacing said piston-like member from said opening comprising means bearing on said means normally closing off said opening, at least one opening in the wall of said chambered member between said first named opening and the edge of the rim on the piston-like member, the cup on said piston-like member being adapted to trap a volume of water when the edge of the rim has moved past said second named opening and to push said volume of water through said first named opening into said first named chambered member, said piston-like member being adapted to move past said second named opening so as to admit water beneath the piston and to isolate said substance from the exterior body of water after the water has had access to said substance, and means to utilize said energy to give the desired operating force.

4. An actuator for developing a fluid operating force upon immersion of the actuator in water comprising a chambered member containing a substance capable of reacting with water to give off energy, an opening in the wall of said chamber to admit water to said chamber upon immersion of said chambered member in water, means dissolvable in water normally closing off said opening from outer media to admit water to said chamber upon immersion and dissolution thereof in water, a second chambered member secured to said first named chambered member and encompassing said opening, a piston-like member in said second chambered member having a rim turned toward said opening and thereby forming a cup, means normally urging said piston-like member toward said opening, means normally spacing said piston-like member from said opening comprising means bearing on said means normally closing off said opening, at least one opening in the wall of said chambered member between said first named opening and the edge of the rim on the piston-like member, the cup on said piston-like member being adapted to trap a volume of water when the edge of the rim has moved past said second named opening and to push said volume of water through said first named opening into said first named chambered member, said piston-like member being adapted to move past said second named opening so as to admit water beneath the piston and to isolate said substance from the exterior body of water after the water has had access to said substance, said second named chambered member being secured to said first named chambered member in such a way as to leave an annular space to accommodate the rim on the piston-like member so that the latter may move close to the first named opening, and means to utilize said energy to give the desired operating force.

5. An actuator for developing a fluid operating pressure upon immersion of the actuator in water comprising a chambered member containing a substance capable of reacting with water to develop heat, a second chambered member within the first named chambered member and closed off therefrom and containing a fluid expansible to develop an operating pressure upon heating of said fluid, means to effect access of water to said substance upon immersion of said first named chambered member in water, means to isolate said substance from the exterior body of water after the water has had access to said substance, and means to discharge the fluid under pressure to be utilized as a fluid operating pressure.

6. In a releasing device for releasing a medium from a container in which the medium is stored under pressure, the combination of a body member to be secured to the container, a frangible disc carried by the body member and confining the medium within the container, disc rupturing means for rupturing the frangible disc to release the medium, means operable by developed fluid pressure to operate the disc rupturing means, a chambered member containing a substance which develops heat upon contact of the substance with water, a second chambered member located within the first named chambered member and closed off therefrom and containing a fluid expansible to develop an operating pressure upon heating of said fluid, a vent to the atmosphere communicating with said second chambered member adapted to relieve any pressure gradually developing therein but not to relieve the pressure suddenly developing upon immersion of the actuator in water, means to effect access of water to said substance upon immersion of the first named chambered member in water, and means defining a pressure transmitting path between said second named chambered member and said means operable by developed fluid pressure.

7. An actuator for developing a fluid operating force upon immersion of the actuator in water comprising a chambered member containing a substance capable of reacting with water to give off energy, an opening in the wall of said chamber to admit water to said chamber upon immersion of said chambered member in water, means dissoluble in water normally closing off said opening from outer media to admit water to said chamber upon immersion and dissolution thereof in water, a second chambered member secured to said first named chambered member and encompassing said opening, a piston-like member in said second chambered member, means normally urging said piston-like member toward said opening, means normally spacing said piston-like member from said opening, said last named means being rendered ineffective upon immersion of the actuator in water, at least one opening in the wall of said second chambered member between said first named opening and said piston-like member, and means to utilize said energy to give the desired operating force.

WALTER H. FREYGANG.

CERTIFICATE OF CORRECTION.

Patent No. 2,088,850.            August 3, 1937.

WALTER H. FREYGANG.

It is hereby certified that error appears in the printed specification of the above numbered patent requiring correction as follows: Page 4, first column, line 30, claim 3, and line 64-65, claim 4, for "dissolvable" read dissoluble; and that the said Letters Patent should be read with these corrections therein that the same may conform to the record of the case in the Patent Office.

Signed and sealed this 1st day of March, A. D. 1938.

(Seal)                                             Henry Van Arsdale.
                                                   Acting Commissioner of Patents.

named chambered member and encompassing said opening, a piston-like member in said second chambered member, means normally urging said piston-like member toward said opening, means normally spacing said piston-like member from said opening, said last named means being rendered ineffective upon immersion of the actuator in water, at least one opening in the wall of said second chambered member between said first named opening and said piston-like member, and means to utilize said energy to give the desired operating force.

WALTER H. FREYGANG.

CERTIFICATE OF CORRECTION.

Patent No. 2,088,850. August 3, 1937.

WALTER H. FREYGANG.

It is hereby certified that error appears in the printed specification of the above numbered patent requiring correction as follows: Page 4, first column, line 30, claim 3, and line 64-65, claim 4, for "dissolvable" read dissoluble; and that the said Letters Patent should be read with these corrections therein that the same may conform to the record of the case in the Patent Office.

Signed and sealed this 1st day of March, A. D. 1938.

(Seal)

Henry Van Arsdale.
Acting Commissioner of Patents.

CERTIFICATE OF CORRECTION.

Patent No. 2,088,850.   August 3, 1937.

WALTER H. FREYGANG.

It is hereby certified that error appears in the printed specification of the above numbered patent requiring correction as follows: Page 4, first column, line 30, claim 3, and line 64-65, claim 4, for "dissolvable" read dissoluble; and that the said Letters Patent should be read with these corrections therein that the same may conform to the record of the case in the Patent Office.

Signed and sealed this 1st day of March, A. D. 1938.

(Seal)

Henry Van Arsdale.
Acting Commissioner of Patents.